US008658752B2

(12) United States Patent
Groenewolt et al.

(10) Patent No.: US 8,658,752 B2
(45) Date of Patent: Feb. 25, 2014

(54) USE OF PARTIALLY SILANIZED POLYISOCYANATE-BASED COMPOUNDS AS CROSSLINKING-AGENTS IN COATING COMPOSITIONS, AND COATING COMPOSITIONS COMPRISING THE COMPOUNDS

(75) Inventors: Matthijs Groenewolt, Münster (DE); Simone Hesener, Münster (DE); Wilfried Stübbe, Greven (DE); Manuela Niemeier, Drensteinfurt (DE); Elke Westhoff, Steinfurt (DE)

(73) Assignee: BASF Coatings GmbH, Munster (DE)

( * ) Notice: Subject to any disclaimer, the term of this patent is extended or adjusted under 35 U.S.C. 154(b) by 10 days.

(21) Appl. No.: 13/001,170

(22) PCT Filed: Jun. 25, 2009

(86) PCT No.: PCT/EP2009/004581
§ 371 (c)(1),
(2), (4) Date: Jan. 28, 2011

(87) PCT Pub. No.: WO2009/156148
PCT Pub. Date: Dec. 30, 2009

(65) Prior Publication Data
US 2011/0269897 A1 Nov. 3, 2011

(30) Foreign Application Priority Data
Jun. 25, 2008 (DE) .................. 10 2008 030 304

(51) Int. Cl.
*C08G 77/04* (2006.01)
(52) U.S. Cl.
USPC ............. 528/27; 528/28; 528/38; 428/423.1
(58) Field of Classification Search
USPC ............. 528/27, 28, 38; 428/423.1
See application file for complete search history.

(56) References Cited

U.S. PATENT DOCUMENTS

| | | | |
|---|---|---|---|
| 3,168,483 A | 2/1965 | Beitchman et al. | |
| 3,707,521 A | 12/1972 | Santis | |
| 3,718,614 A | 2/1973 | Smyth | |
| 3,959,403 A | 5/1976 | LaRochelle | |
| 4,278,783 A | 7/1981 | Taniyama et al. | |
| 4,479,990 A | 10/1984 | Dixon et al. | |
| 4,499,150 A | 2/1985 | Dowbenko et al. | |
| 4,499,151 A | 2/1985 | Dowbenko et al. | |
| 4,598,131 A | 7/1986 | Prucnal | |
| 4,710,542 A | 12/1987 | Forgione et al. | |
| 4,853,146 A | 8/1989 | Rorig et al. | |
| 5,041,239 A | 8/1991 | Rorig et al. | |
| 5,225,248 A | 7/1993 | Stephenson | |
| 5,238,993 A | 8/1993 | Hsieh | |
| 5,250,605 A | 10/1993 | Hazan et al. | |
| 5,516,559 A | 5/1996 | Rockrath et al. | |
| 5,691,439 A | 11/1997 | Slack et al. | |
| 5,716,678 A | 2/1998 | Rockrath et al. | |
| 5,719,251 A | 2/1998 | Wilczek et al. | |
| 5,747,590 A | 5/1998 | Corcoran et al. | |
| 5,908,895 A | 6/1999 | Vogt-Birnbrich et al. | |
| 5,985,463 A | 11/1999 | Lin et al. | |
| 6,403,699 B1 | 6/2002 | Rockrath et al. | |
| 6,492,482 B2 | 12/2002 | Lomoelder et al. | |
| 6,607,833 B1 | 8/2003 | Uhlianuk et al. | |
| 7,772,320 B2 | 8/2010 | Poppe et al. | |
| 7,858,732 B2 | 12/2010 | Bruchmann et al. | |
| 8,013,099 B2 | 9/2011 | Poppe et al. | |
| 2002/0142169 A1* | 10/2002 | Hofacker et al. | 428/423.1 |
| 2003/0027921 A1 | 2/2003 | Speier et al. | |
| 2004/0106726 A1 | 6/2004 | Joshi et al. | |
| 2005/0165177 A1 | 7/2005 | Wagner et al. | |
| 2005/0238899 A1 | 10/2005 | Nagata et al. | |
| 2006/0045965 A1 | 3/2006 | Lin | |
| 2006/0217472 A1 | 9/2006 | Staunton | |
| 2007/0059532 A1 | 3/2007 | Ramesh et al. | |
| 2007/0213501 A1 | 9/2007 | Bruchmann et al. | |
| 2008/0047469 A1 | 2/2008 | Poppe et al. | |
| 2008/0075871 A1 | 3/2008 | Ambrose et al. | |
| 2008/0245999 A1 | 10/2008 | Poppe et al. | |
| 2009/0223631 A1 | 9/2009 | Poppe et al. | |
| 2009/0275680 A1 | 11/2009 | Bruchmann et al. | |
| 2009/0281271 A1 | 11/2009 | Bruchmann et al. | |
| 2010/0015344 A1 | 1/2010 | Groenewolt et al. | |
| 2010/0028544 A1 | 2/2010 | Groenewolt et al. | |
| 2010/0143596 A1 | 6/2010 | Groenewolt et al. | |

(Continued)

FOREIGN PATENT DOCUMENTS

DE   10103027 A1   7/2002
DE   69625241 T2   9/2003

(Continued)

OTHER PUBLICATIONS

International Search Report for international application No. PCT/EP2009/004581 dated Oct. 5, 2009.
Written Opinion for international application No. PCT/EP2009/004581 dated Oct. 5, 2009.
International Preliminary Report on Patentability for International application No. PCT/EP2009/004581 dated Jan. 18, 2011.
Co-Pending U.S. Appl. No. 12/519,449, filed Jun. 16, 2009.
Co-Pending U.S. Appl. No. 12/519,458, filed Oct. 29, 2009.
Co-Pending U.S. Appl. No. 12/519,466, filed Jun. 16, 2009.
Co-Pending U.S. Appl. No. 12/808,973, filed Oct. 18, 2008.
Co-Pending U.S. Appl. No. 12/808,985, filed Dec. 18, 2008.
Co-Pending U.S. Appl. No. 12/808,987, filed Sep. 29, 2010.
Co-Pending U.S. Appl. No. 13/132,847, filed Jun. 22, 2011.
Co-Pending U.S. Appl. No. 13/378,817, filed Dec. 16, 2011.

(Continued)

*Primary Examiner* — Peter D Mulcahy
(74) *Attorney, Agent, or Firm* — Cantor Colburn LLP

(57) ABSTRACT

The invention relates to the use of partly silanized compounds based on polyisocyanate as crosslinking agents with heightened refractive index in curable coating compositions, more particularly in clearcoat materials for automotive finishing. The invention likewise relates to a coating composition which comprises these compounds as crosslinking agents, and to the use of the coating composition to produce a coating.

25 Claims, No Drawings

(56) References Cited

U.S. PATENT DOCUMENTS

| | | |
|---|---|---|
| 2011/0027489 A1 | 2/2011 | Groenewolt et al. |
| 2011/0045190 A1 | 2/2011 | Groenewolt et al. |
| 2011/0059251 A1 | 3/2011 | Poppe et al. |
| 2011/0245406 A1 | 10/2011 | Klein et al. |
| 2011/0263789 A1 | 10/2011 | Taniguchi et al. |
| 2012/0100380 A1 | 4/2012 | Groenewolt |

FOREIGN PATENT DOCUMENTS

| | | |
|---|---|---|
| DE | 102004050746 A1 | 4/2006 |
| DE | 60116825 T2 | 7/2006 |
| DE | 102005003299 A1 | 7/2006 |
| DE | 102005045228 A1 | 4/2007 |
| DE | 102006024823 A1 | 12/2007 |
| DE | 102007013242 A1 | 9/2008 |
| DE | 102007026722 A1 | 12/2008 |
| DE | 102007061855 A1 | 6/2009 |
| DE | 102008060454 A1 | 6/2010 |
| EP | 0008127 A1 | 2/1980 |
| EP | 0245700 B1 | 11/1987 |
| EP | 0249201 A2 | 12/1987 |
| EP | 0276501 A2 | 8/1988 |
| EP | 0692007 A1 | 12/1994 |
| EP | 0626888 B1 | 5/1997 |
| EP | 0571073 B1 | 7/1997 |
| EP | 0949308 A1 | 10/1999 |
| EP | 0994117 A1 | 4/2000 |
| EP | 1193278 A1 | 4/2002 |
| EP | 1273640 A2 | 1/2003 |
| EP | 1334989 A2 | 8/2003 |
| EP | 0991690 B1 | 8/2004 |
| EP | 1502927 A1 | 2/2005 |
| EP | 2102263 B1 | 9/2009 |
| JP | 10306251 A | 11/1998 |
| WO | WO9422968 A1 | 10/1994 |
| WO | WO9712945 A1 | 4/1997 |
| WO | W00055229 A1 | 9/2000 |
| WO | WO0109260 A1 | 2/2001 |
| WO | WO0198393 A1 | 12/2001 |
| WO | W003093343 A1 | 11/2003 |
| WO | WO2004014991 A1 | 2/2004 |
| WO | WO2004046218 A1 | 6/2004 |
| WO | WO2004104078 A1 | 12/2004 |
| WO | WO2005003340 A2 | 1/2005 |
| WO | WO2005012382 A1 | 2/2005 |
| WO | WO2005033240 A1 | 4/2005 |
| WO | WO2005090500 A1 | 9/2005 |
| WO | WO2005118677 A1 | 12/2005 |
| WO | WO2006042584 A1 | 4/2006 |
| WO | WO2006042658 A1 | 4/2006 |
| WO | WO2006042585 A1 | 4/2006 |
| WO | WO2006099054 A2 | 9/2006 |
| WO | WO2006131314 A1 | 12/2006 |
| WO | WO2007003857 A3 | 1/2007 |
| WO | WO2007016234 A2 | 2/2007 |
| WO | WO2007033786 A1 | 3/2007 |
| WO | WO2007137632 A1 | 12/2007 |
| WO | WO2008074489 A1 | 6/2008 |
| WO | WO2008074490 A1 | 6/2008 |
| WO | WO2008074491 A1 | 6/2008 |
| WO | WO2008110230 A1 | 9/2008 |

OTHER PUBLICATIONS

A. Albert, et al.; "Determination of Ionization Constants by Potentiometrictitration Using a Glass Electrode"; The Determination of Ionization Constants, A Laboratory Manual, Third Edition; Chapman and Hall, London, NY (1984); pp. 14-38.
Industrial Coatings Technical Data Sheet, Basonat HI 190 B/S, BASF The Chemical Company, Dec. 2010, 3 pages.
Machine Translation into English of EP1334989A2.
"Dissociation Constants in Water" (Titration Method—Spectrophotometric Method—Conductometric Method); OECD Guideline for Testing of Chemicals, 112; May 12, 1981; pp. 1-7.
Opposition to EP 2 102 263 B1, Title: "Coating Agents Having High Scratch Resistance and Weathering Stability", Patentee: BASF Coatings GmbH, Munster, by PPG Industries Ohio, Inc., Cleveland, OH, filed with the European Patent Office on Apr. 5, 2012, 21 pages.
Römpp Lexikon "Lacke and Druckfarben," Georg Thieme Verlag, Stuttgart, 1998, pp. 250 to 252.
B. Singh, P.S. Forgione, J.a. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.
English Translation of International Preliminary Report on Patentability for International Application No. PCT/EP2007/011190 issued Jun. 7, 2009.
International Search Report for International Application No. PCT/EP2007/011190 mailed Apr. 14, 2008.
English Translation of Written Opinion for International Application No. PCT/EP2007/011190 mailed Apr. 14, 2008.
English Translation of International Preliminary Report on Patentability for International Application No. PCT/EP2007/011191 issued Jun. 7, 2009.
International Search Report for International Application No. PCT/EP2007/011191 mailed Apr. 14, 2008.
English Translation of Written Opinion for International Application No. PCT/EP2007/011191 mailed Apr. 14, 2008.
English Translation of International Preliminary Report on Patentability for International Application No. PCT/EP2007/011192 issued Jun. 7, 2009.
International Search Report for International Application No. PCT/EP2007/011192 mailed Apr. 14, 2008.
English Translation of Written Opinion for International Application No. PCT/EP2007/011192 mailed Apr. 14, 2008.
English Translation of International Preliminary Report on Patentability for International Application No. PCT/EP2008/010808 issued Jul. 20, 2010.
International Search Report of International Application No. PCT/EP2008/010808 mailed Apr. 3, 2009.
Written Opinion for International Application No. PCT/EP2008/010808 mailed Apr. 3, 2009.
English Translation of International Preliminary Report on Patentability for International Application No. PCT/EP2008/010809 issued Jul. 20, 2010.
International Search Report for International Application No. PCT/EP2008/010809 mailed May 8, 2009.
Written Opinion for International Application No. PCT/EP2008/010809 mailed May 8, 2009.
English Translation of International Preliminary Report on Patentability for International Application No. PCT/EP2008/010810 issued Jul. 20, 2010.
International Search Report for International Application No. PCT/EP2008/010810 mailed Apr. 28, 2009.
English Translation of Written Opinion for International Application Mo. PCT/EP2008/010810 mailed Apr. 28, 2009.
English Translation of International Preliminary Report on Patentability for International Application No. PCT/EP2009/006110 issued Jun. 7, 2011.
English Translation of International Search Report for International Application No. PCT/EP2009/006110 mailed Nov. 25, 2009.
English Translation of Written Opinion for International Application No. PCT/EP2009/006110 mailed Nov. 25, 2009.
English Translation of International Preliminary Report on Patentability for International Application No. PCT/EP2010/001422 issued Jan. 17, 2012.
English Translation of International Search Report for International Application No. PCT/EP2010/001422 mailed Jul. 5, 2010.
English Translation of Written Opinion for International Application No. PCT/EP2010/001422 mailed Jul. 5, 2010.

* cited by examiner

USE OF PARTIALLY SILANIZED POLYISOCYANATE-BASED COMPOUNDS AS CROSSLINKING-AGENTS IN COATING COMPOSITIONS, AND COATING COMPOSITIONS COMPRISING THE COMPOUNDS

CROSS REFERENCE TO RELATED APPLICATIONS

This application is a National Phase Application of Patent Application PCT/EP2009/004581 filed on Jun. 25, 2009, which claims priority to DE 10 2008 030 304.6, filed Jun. 25, 2008, both of which are hereby incorporated by reference in their entirety.

FIELD OF THE INVENTION

The invention relates to the use of partly silanized compounds based on polyisocyanate as crosslinking agents with heightened refractive index in curable coating compositions, more particularly in clearcoat materials for automotive finishing. The invention likewise relates to a coating composition which comprises these compounds as crosslinking agents, and to the use of the coating composition to produce a coating.

BACKGROUND OF THE INVENTION

Partly silanized crosslinking agents based on hexamethylene diisocyanate are known from the prior art (EP 1 273 640 A2). The coatings obtained therewith feature scratch resistance and weathering stability, uniting as they do the advantages of purely organic coating systems with those of inorganic coatings.

These coatings are suitable in principle for all applications imposing heightened requirements in terms of mechanical loads. One specific case of an application where such mechanical properties are of interest is in automotive finishing. That application is not only marked by exacting requirements on the functional properties of the coatings, but likewise imposes exacting requirements on the decorative properties.

It is necessary, for instance, that the surface is particularly smooth and, where appropriate, that the basecoat situated beneath a clearcoat is supported much more than being impaired, in its capacity as a coloring coat. For this reason, particularly transparent and high-gloss clearcoat materials are desirable. At the same time, however, the other advantageous properties, such as high acid resistance, smoothness, and scratch resistance of the coating, are to be retained.

The gloss, as the value for the reflection of the light for a defined angle of incidence, depends heavily on the refractive index of the coat material. The greater the amount of light reflected, the greater the difference in the refractive index of ambient medium and coat. For this reason a brilliant, high-gloss surface is obtained when, for example, a polyester-based coat material is used, since polyesters possess a high refractive index. The refractive index of a coat material may likewise be increased through the addition of appropriate fillers such as silica, for example.

There has to date been no description of any process allowing the use of partly silanized, isocyanate-containing crosslinking agents to adjust the refractive index of the crosslinking agent and/or to increase the refractive index of the crosslinking agent.

A problem addressed by the present invention is therefore that of providing, for the production of a coating composition, crosslinking agents based on isocyanate compounds that exhibit a heightened refractive index, more particularly a refractive index nD20≥1.500.

A further problem addressed by the present invention was that of providing a coating composition (coat material) that leads to a coating (coat film) which exhibits increased light reflection and has a higher gloss than the coat films known from the prior art. The coating composition ought to be suitable more particularly for producing the clearcoat in OEM finishes and for use in automotive refinish systems.

Furthermore, the coat film ought also to meet the other functional requirements imposed on coatings and coat systems, more particularly on clearcoat systems within the technologically and esthetically particularly demanding field of automotive OEM finishing. The coating ought therefore to exhibit high acid resistance. In addition, the coating ought to have a high level of scratch resistance and ought more particularly to exhibit high loss retention after scratch exposure. Furthermore, the coating and coat system, more especially the clearcoat system, ought to be able to be produced even in coat thicknesses>40 μm without stress cracks occurring.

Furthermore, the application of the coating composition ought not to cause any environmental problems.

SUMMARY OF THE INVENTION

Solution to the Problem

The problem is solved through the use of a compound (V), based on at least one isocyanate compound (A) having an average NCO functionality of 2.0 to 6.0, wherein 0.1 to 99 mol % of the isocyanate groups originally present have been reacted with at least one compound of the general formula (I)

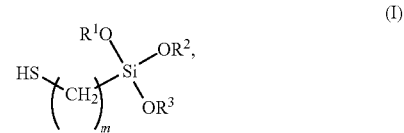

where
m is 2, 3 or 4;
and
$R^1$, $R^2$, and $R^3$, independently of one another, are each H, unsubstituted or at least monosubstituted alkyl or unsubstituted or at least monosubstituted heteroalkyl.

The reaction products of the isocyanate compounds (A) with compounds of the general formula (I) are known per se from WO 2005/012382 A1. In that disclosure they are reacted further with an aminosilane, as intermediates in the preparation of a primer composition for glass and glass ceramics.

The term "alkyl" in the sense of the present invention embraces acyclic saturated hydrocarbon radicals, which may be branched or straight-chain and also unsubstituted or at least monosubstituted, having, as in the case of $C_{1-12}$ alkyl, 1-12 (i.e., 1, 2, 3, 4, 5, 6, 7, 8, 9, 10, 11 or 12) C atoms. Where one or more of the substituents is an alkyl radical which is substituted, it may be substituted preferably with, where appropriate, 1, 2, 3, 4 or 5, more preferably with 1, 2 or 3, substituents, selected independently of one another from the group consisting of F, Cl, Br, I, —$NO_2$, —CN, and —$CF_3$.

Examples of suitable $C_{1-12}$ alkyl radicals, which may be unsubstituted or mono- or polysubstituted, include methyl, ethyl, n-propyl, isopropyl, n-butyl, isobutyl, 2-butyl, tert-butyl, n-pentyl, 2-pentyl, 3-pentyl, isopentyl, neopentyl, n-hexyl, 2-hexyl, 3-hexyl, n-heptyl, n-octyl, and n-nonyl.

By polysubstituted alkyl radicals are meant those alkyl radicals which are substituted two or more times, preferably two or three times, either on different C atoms or on same C atoms—for example, three times on the same C atom as in the case of —$CF_3$ or at different locations as in the case of —(CHCl)—($CH_2$F). The polysubstitution may involve the same substituent or different substituents. Examples of suitable substituted alkyl radicals include —$CF_3$, —$CF_2$H, —$CFH_2$, —($CH_2$)—($CF_3$)—($CH_2$)—($CHF_2$), and —($CH_2$)—($CH_2$F).

The term "heteroalkyl" identifies an alkyl radical as described above in which one or more C atoms have each been replaced by a heteroatom selected independently of one another from the group consisting of oxygen, sulfur, and nitrogen (NH). Heteroalkyl radicals may have preferably 1, 2 or 3 heteroatoms selected independently of one another from the group consisting of oxygen, sulfur, and nitrogen (NH), as chain members. Heteroalkyl radicals may preferably be two- to twelve-membered.

Examples of suitable heteroalkyl radicals, which may be unsubstituted or mono- or polysubstituted, include —$CH_2$—O—$CH_3$, —$CH_2$—O—$C_2H_5$, —$CH_2$—O—CH($CH_3$)$_2$, —$CH_2$—O—C($CH_3$)$_3$, —$CH_2$—S—$CH_3$, —$CH_2$—S—$C_2H_5$, —$CH_2$—S—CH($CH_3$)$_2$, —$CH_2$—S—C($CH_3$)$_3$, —$CH_2$—NH—$CH_3$, —$CH_2$—NH—$C_2H_5$, —$CH_2$—NH—CH($CH_3$)$_2$, —$CH_2$—NH—C($CH_3$)$_3$, —$CH_2$—$CH_2$—O—$CH_3$, —$CH_2$—$CH_2$—O—$C_2H_5$, —$CH_2$—$CH_2$—O—CH($CH_3$)$_2$, —$CH_2$—$CH_2$—O—C($CH_3$)$_3$, —$CH_2$—$CH_2$—S—$CH_3$, —$CH_2$—$CH_2$—S—$C_2H_5$, —$CH_2$—$CH_2$—S—CH($CH_3$)$_2$, —$CH_2$—$CH_2$—S—C($CH_3$)$_3$, —$CH_2$—$CH_2$—NH—$CH_3$, —$CH_2$—$CH_2$—NH—$C_2H_5$, —$CH_2$—$CH_2$—NH—CH($CH_3$)$_2$, —$CH_2$—$CH_2$—NH—C($CH_3$)$_3$, —$CH_2$—S—$CH_2$—O—$CH_3$, —$CH_2$—O—$CH_2$—O—$C_2H_5$, —$CH_2$—O—$CH_2$—O—CH($CH_3$)$_2$, —$CH_2$—S—$CH_2$—O—C($CH_3$)$_3$, —$CH_2$—O—$CH_2$—S—$CH_3$, —$CH_2$—O—$CH_2$—S—$C_2H_5$, —$CH_2$—O—$CH_2$—S—CH($CH_3$)$_2$, —$CH_2$—NH—$CH_2$—S—C($CH_3$)$_3$, —$CH_2$—O—$CH_2$—NH—$CH_3$, —$CH_2$—O—$CH_2$—NH—$C_2H_5$, —$CH_2$—O—$CH_2$—NH—CH($CH_3$)$_2$, —$CH_2$—S—$CH_2$—NH—C($CH_3$)$_3$, and —$CH_2$—$CH_2$—C(H)($CH_3$)—($CH_2$)$_3$—$CH_3$.

Examples of suitable substituted heteroalkyl radicals include —($CH_2$)—O—($CF_3$), —($CH_2$)—O—($CHF_2$), —($CH_2$)—O—($CH_2$F), —($CH_2$)—S—($CF_3$), —($CH_2$)—S—($CHF_2$), —($CH_2$)—S—($CH_2$F), —($CH_2$)—($CH_2$)—O—($CF_3$), —($CF_2$)—O—($CF_3$), —($CH_2$)—($CH_2$)—S—($CF_3$), and —($CH_2$)—($CH_2$)—($CH_2$)—O—($CF_3$).

Preferably 5 to 95 mol %, more preferably 10 to 90 mol %, very preferably 20 to 80 mol %, and more preferably still 30 to 70 mol % of the isocyanate groups originally present in the isocyanate compound (A) are reacted with at least one compound of the general formula (I).

The reaction of isocyanate groups of the isocyanate compound (A) with compounds of the general formula (I) produces thiourethane groups which have a structural unit of the formula (II)

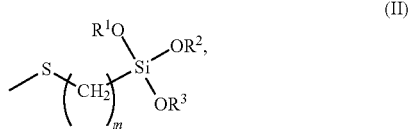

(II)

where m, $R^1$, $R^2$, and $R^3$ areas defined above.

In the light of the prior art it was surprising and unforeseeable for the skilled worker that the problems addressed by the present invention could be solved through the use of a compound (V) as defined above as a crosslinking agent in a coating composition.

The compounds (V) defined above exhibit a heightened refractive index and can be used in coating compositions which produce coatings and coat systems, especially clearcoat systems, which exhibit high gloss. More particularly the coating compositions which comprise a compound (V) as defined above as a crosslinking agent lead to coatings with a higher gloss than prior-art coating materials which comprise amino-functional silanes.

Furthermore, the coatings obtainable through the use of a compound (V) as defined above as a crosslinking agent in a coating composition are scratch-resistant and acid-resistant. Likewise, these coatings and coat systems, especially the clearcoat systems, can be produced even at coat thicknesses>40 μm without stress cracks occurring. Accordingly these coatings and coat systems, more particularly the clearcoat systems, can be used in the technologically and esthetically particularly demanding field of automotive OEM finishing.

Preference is given to the use of a compound (V) as defined above, based on the reaction of at least one isocyanate compound (A) with at least one compound of the general formula (I)

where m is 2, 3 or 4;

and $R^1$, $R^2$ and $R^3$, independently of one another, are each H, unsubstituted $C_{1-12}$ alkyl or unsubstituted 2- to 12-membered heteroalkyl.

Particular preference is given to the use of a compound (V) as defined above, based on the reaction of at least one isocyanate compound (A) with at least one compound of the general formula (I)

where m is 3;

and $R^1$, $R^2$, and $R^3$, independently of one another, are each H, methyl, ethyl, n-propyl, isopropyl, n-butyl, isobutyl, 2-butyl, tert-butyl, n-pentyl, 2-pentyl, isopentyl or neo-pentyl.

Very particular preference is given to the use of a compound (V) as defined above, based on the reaction of at least one isocyanate compound (A) with at least one compound of the general formula (I) where m is 3;

and $R^1$, $R^2$, and $R^3$, independently of one another, are each ethyl or methyl.

DETAILED DESCRIPTION OF AN EMBODIMENT OF THE INVENTION

The Isocyanate Compounds (A)

The polyisocyanates that serve as parent structures for the isocyanate compounds (A) having an average NCO functionality of 2.0 to 6.0 are preferably conventional substituted or unsubstituted aromatic, aliphatic, cycloaliphatic and/or heterocyclic polyisocyanates.

Examples of polyisocyanates used preferably are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenyl diisocyanate, tetramethylene 1,4-diisocyanate, hexamethylene 1,6-diisocyanate, 2,2,4- trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Further-preferred polyisocyanates are the polyisocyanates derived from a polyisocyanate by trimerization, dimerization, urethanization, biuretization, or allophanatization.

Polyisocyanates used with particular preference are hexamethylene 1,6-diisocyanate, isophorone diisocyanate, and 4,4'-methylenedicyclohexyl diisocyanate. Particular preference is also given to the polyisocyanates derived from hexamethylene 1,6-diisocyanate, isophorone diisocyanate or 4,4'-methylenedicyclohexyl diisocyanate by trimerization, dimerization, urethanization, biuretization or allophanatization, more particularly the biuret dimers and isocyanurate trimers derived from the above-stated parent structures.

In a further embodiment of the invention the polyisocyanates are polyisocyanate prepolymers having urethane structural units which are obtained by reacting polyols with a stoichiometric excess of above-stated polyisocyanates. Polyisocyanate prepolymers of this kind are described for example in U.S. Pat. No. 4,598,131.

The compounds (V) used with very particular preference, functionalized with the structural units of the formula (II), are prepared with particular preference by reacting the above-stated polyisocyanates with at least one compound of the general formula (I)

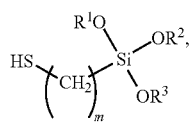

where m, $R^1$, $R^2$, and $R^3$ are as defined above.

Preferably between 0.1 to 99 mol %, more preferably between 5 to 95 mol %, very preferably between 10 to 90 mol %, more preferably still between 20 to 80 mol %, most preferably between 30 to 70 mol % of the isocyanate groups originally present in the isocyanate compounds (A) are reacted with at least one compound of the general formula (I).

Compounds of the general formula (I) that are used with particular preference are 2-mercaptoethyltrimethoxysilane, 3-mercaptopropyltrimethoxysilane, and 4-mercaptobutyltrimethoxysilane. Very particular preference is given to the use of 3-mercaptopropyltrimethoxysilane. Examples of functionalized silanes of this kind are available under the brand name Dynasylan® MTMO from Evonik.

Compounds (V) used with particular preference are reaction products of hexamethylene 1,6-diisocyanate and/or isophorone diisocyanate, and/or the isocyanurate trimers thereof, with 3-mercaptopropyltrimethoxysilane.

The reaction of the isocyanate compounds (A) with the compounds (I) takes place preferably in an inert gas atmosphere at temperatures of not more than 100° C., preferably not more than 60° C.

The unreacted isocyanate groups of the compound (V) may also be present in blocked form. This is preferably the case when coating compositions are used as one-component systems. For the purpose of blocking it is possible in principle to use any blocking agent that can be used for the blocking of polyisocyanates and has a sufficiently low deblocking temperature. Blocking agents of this kind are familiar to the skilled worker. Preference is given to using blocking agents of the kind described in EP-A-0626888 and EP-A-0692007.

The compounds (V) used may additionally be present as reaction products of amino-functional silanes.

Amino-functional silanes used with preference are bis(2-ethyltrimethoxysilyl)amine, bis(3-propyltrimethoxysilyl) amine, bis(4-butyltrimethoxysilyl)amine, bis(2-ethyl-triethoxysilyl)amine, bis(3-propyltriethoxysilyl)amine and/or bis(4-butyltriethoxysilyl)amine. Aminosilanes of this kind are available for example under the brand name DYNASILAN® from DEGUSSA or Silquest® from OSI.

Amino-functional silanes likewise used with preference are 2-aminoethyltrimethoxysilane, 2-aminoethyltriethoxysilane, 3-aminopropyltrimethoxy-silane, 3-aminopropyltriethoxysilane, 4-aminobutyltrimethoxysilane, 4-aminobutyltriethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxy-butyltrimethoxysilane, and 4-hydroxybutyltriethoxysilane.

Amino-functional silanes used with particular preference are N-(2-(trimethoxysilyl)-ethyl)alkylamine, N-(3-(trimethoxysilyl)propyl)alkylamine, N-(4-(trimethoxysilyl)butyl)-alkylamine, N-(2-(triethoxysilyl)ethyl)alkylamine, N-(3-(triethoxysilyl)propyl)alkylamine and/or N-(4-(triethoxysilyl)butyl)alkylamine.

Used with very particular preference as amino-functional silanes are N-(3-(trimethoxysilyl) propyl)butylamine and also bis(3-trimethoxysilylpropyl)amine.

Aminosilanes of this kind are available for example under the brand name DYNASILAN® from DEGUSSA or Silquest® from OSI.

Preferably the compounds of the general formula (I) and the amino-functional silanes are reacted in a proportion between 9:1 and 1:9, more preferably in a proportion between 5:1 and 1:5, very preferably in a proportion between 3:1 and 1:1, based in each case on the amount of the compounds of the general formula (I) on the one hand and on the amount of the amino-functional silanes on the other hand, with the isocyanate compounds (A).

Preference is given to the use of compounds (V) based on at least one isocyanate compound (A) in which 5 to 95 mol % of the isocyanate groups originally present have been reacted with compounds of the above-stated formula (I) and amino-functional silanes, in the proportions described above, as crosslinking agents.

Preference is further given to the use of compounds (V) which have a refractive index nD20≥1.500, more preferably a refractive index nD20≥1.501, at a temperature of 20° C., as crosslinking agents.

The refractive index nD20 may be determined by refractometry at 20° C. in accordance with the typical methods known to the skilled worker.

The Hydroxyl Compound (B)

In principle it is possible to use all compounds having 2 or more than 2 OH groups as compounds (B).

As hydroxyl compound (B) it is preferred to use a low molecular mass polyol, an oligomeric polyol, a polymeric polyol or a mixture of these polyols.

Low molecular mass polyols used are, for example, diols, such as preferably ethylene glycol, neopentyl glycol, 1,2-propanediol, 2,2-dimethyl-1,3-propanediol. 1,4-Butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols having more than 2 OH groups, such as preferably trimethylolethane, trimethylolpropane, trimethylolhexane, 1,2,4-butanetriol, pentaerythritol, and dipentaerythritol.

Low molecular mass polyols of this kind are admixed preferably in minor fractions to an oligomeric and/or polymeric polyol component (B), where the hydroxyl compound (B) is present in that form.

The oligomeric and/or polymeric polyols (B) used with preference have mass-average molecular weights Mw>500 daltons, measured by means of GPC (gel permeation chromatography) using a polystyrene standard, preferably between 800 and 100,000 daltons, more preferably between 1,000 and 50,000 daltons. Particular preference is given to using polyester polyols, polyurethane polyols, polysiloxane polyols, and, more particularly, polyacrylate polyols and/or polymethacrylate polyols, and also their copolymers, referred to below as poly(meth)acrylate polyols. The polyols preferably have an OH number of 30 to 400 mg KOH/g, more preferably between 100 and 300 mg KOH/g. The glass transition temperatures, as measured by DSC (differential thermoanalysis), of the polyols are preferably between −150 and 100° C., more preferably between −120° C. and 80° C. Suitable polyester polyols are described for example in EP-A-0 994 117 and EP-A-1 273 640. Polyurethane polyols are prepared preferably by reacting polyester polyol prepolymers with suitable di- or polyisocyanates and are described for example in EP-A-1 273 640. Suitable polysiloxane polyols are described for example in WO-A-01/09260, the polysiloxane polyols recited therein being useful preferably in combination with further polyols, more particularly those with higher glass transition temperatures.

The poly(meth)acrylate polyols that are used with very particular preference in accordance with the invention are generally copolymers and preferably have mass-average molecular weights Mw between 1,000 and 20,000 daltons, more preferably between 1,500 and 10,000 daltons, measured in each case by means of gel permeation chromatography (GPC) against a polystyrene standard. The glass transition temperature of the copolymers is generally between −100 and 100° C., more particularly between −50 and 80° C. (measured by means of DSC). The poly(meth)acrylate polyols preferably have an OH number of 60 to 250 mg KOH/g, more preferably between 70 and 200 mg KOH/g, and also an acid number between 0 and 30 mg KOH/g.

The hydroxyl number (OH number) indicates the number of mg of potassium hydroxide that are equivalent to the amount of acetic acid bound in acetylation by 1 g of substance. For the determination, the sample is boiled with acetic anhydride-pyridine and the resultant acid is titrated with potassium hydroxide solution (DIN 53240-2).

The acid number here indicates the number of mg of potassium hydroxide that are consumed in neutralizing 1 g of the respective compound of component (B) (DIN EN ISO 2114).

Hydroxyl-containing monomer units used for the poly(meth)acrylate polyols are preferably hydroxyalkyl acrylates and/or hydroxyalkyl methacrylates, such as more particularly 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and more particularly 4-hydroxybutyl acrylate and/or 4-hydroxybutyl methacrylate.

Further monomer units used for the poly(meth)acrylate polyols are preferably alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, more particularly, cyclohexyl acrylate and/or cyclohexyl methacrylate.

Further monomer units which can be used for the poly(meth)acrylate polyols include vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, more particularly, acrylic and/or methacrylic acid.

The Combination of Components (V) and (B) and Also Further Components of the Coating Composition The present invention further provides a coating composition comprising at least one binder, at least one solvent, and at least one compound (V), as defined above, as a crosslinking agent.

Preferably said at least one binder is a hydroxyl compound (B).

The weight fraction of the hydroxyl compounds (B) to be used, based on the weight fraction of the isocyanate compounds (V), is dependent on the hydroxyl equivalent weight of the hydroxyl compounds (B) and on the equivalent weight of the unreacted isocyanate groups of the polyisocyanate (V).

Relative to the sum of the functional groups that are critical for crosslinking in the coating composition, formed from the fractions of the hydroxyl groups and isocyanate groups and also from the fractions of the structural units of the formula (II), the structural units of the formula (II) are present preferably in fractions of 2.5 to 97.5 mol %, more preferably between 5 and 95 mol %, and very preferably between 10 and 90 mol %.

The level at which the amount of structural units of the formula (II) is chosen is preferably at most such that the coating composition of the invention contains less than 6.5% by mass of silicon of structural units (II), more preferably not more than 6.0% by mass of silicon of structural units (II), based in each case on the nonvolatile fraction of the coating composition.

The weight fractions of the hydroxyl compounds (B) and of the isocyanate compounds (V) are chosen preferably such that the molar equivalent ratio of the unreacted isocyanate groups of the isocyanate compounds (V) to the hydroxyl groups of the hydroxyl compounds (B) is between 0.9:1 and 1:1.1, preferably between 0.95:1 and 1.05:1, more preferably between 0.98:1 and 1.02:1.

Where the coating compositions are one-component (1K) compositions, the compounds (V) containing isocyanate groups are chosen whose isocyanate groups that have not been reacted with compounds of the formula (I) are blocked with the blocking agents described above.

The coating compositions are preferably 2-component (2K) coating compositions. These 2K coating compositions are composed of a first component, which comprises at least one compound (V) containing isocyanate groups and also, where appropriate, at least one solvent and, where appropriate, at least one further constituent; and of a second component, which comprises at least one hydroxyl compound (B) and also, where appropriate, at least one solvent and, where appropriate, at least one further constituent.

The invention further provides for the use of a coating composition of the invention to produce a coating.

It is preferred to use a 2-component (2K) coating composition to produce a coating. In that case, shortly before the application of the coating composition, the first component of the coating composition, comprising at least one compound (V) containing isocyanate groups and also, where appropriate, at least one solvent and, where appropriate, at least one further constituent, is mixed with the second component of the coating composition, comprising at least one hydroxyl compound (V) and also, where appropriate, at least one solvent and, where appropriate, at least one further constituent, and also, where appropriate, with further constituents, in a conventional manner, the second component of the coating system, which comprises the compound (B), generally comprising a catalyst and also some of the solvent.

As catalysts for crosslinking the alkoxysilyl units and also for the reaction between the hydroxyl groups of the compound (B) and the isocyanate groups of the compound (V) that have not been reacted with a compound of the formula (I) it is possible to use compounds that are known per se. Examples are Lewis acids (electron-deficient compounds), such as, for example, tin naphthenate, tin benzoate, tin octoate, tin butyrate, dibutyltin dilaurate, dibutyltin diacetate, dibutyltin oxide, lead octoate, and also catalysts as described in WO-A-2006/042585. Catalysts used for the crosslinking of the alkoxysilyl units are preferably amine adducts of phosphoric acid or sulfonic acid (e.g., Nacure products from King Industries), more preferably amine-blocked phosphoric acids.

As catalysts it is particularly preferred to use phosphorus catalysts, more preferably phosphorus and nitrogen catalysts. In this context it is also possible to use mixtures of two or more different catalysts.

Examples of suitable phosphorus catalysts are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in German patent application DE-A-102005045228.

Very particular preference, however, is given to using substituted phosphoric monoesters and phosphoric diesters, preferably from the group consisting of acyclic phosphoric diesters and cyclic phosphoric diesters, more preferably amine adducts of the phosphoric monoesters and diesters. Use is made more particularly of the corresponding amine-blocked phosphoric esters, and among these preferably of amine-blocked phosphoric acid ethylhexyl esters and amine-blocked phosphoric acid phenyl esters, with very particular preference amine-blocked bis(2-ethylhexyl) phosphate.

The catalysts are used preferably in fractions of 0.01% to 20% by weight, more preferably in fractions of 0.1% to 10% by weight, based on the nonvolatile constituents of the coating composition as a whole. A lower catalyst activity can be partially compensated by means of correspondingly higher quantities employed.

Besides an amine-blocked phosphoric acid, the coating composition used may comprise, as a further catalyst, an unsaturated dicyclic amine. This amine is preferably 1,5-diazabicyclo[4.3.0]non-5-ene or 1,8-diazabicyclo[5.4.0]undec-7-ene. The amine is used preferably in fractions of 0.01% to 20% by weight, more preferably in fractions of 0.1% to 10% by weight, based on the nonvolatile constituents of the coating composition as a whole. The amount of catalyst used also has a certain influence on the crosslinking. A low catalyst activity can be partially compensated by means of correspondingly higher quantities employed.

Solvents suitable for the coating compositions are more particularly those which within the coating composition are chemically inert toward the compounds (B) and (V) and also do not react with (B) or (V) when the coating material is cured. Examples of solvents of this kind are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the above-stated solvents. Preferably the aprotic solvents or solvent mixtures have a water content of not more than 1% by weight, more preferably not more than 0.5% by weight, based on the solvent.

Besides compounds (B) and (V) it is also possible to use further binders (C) to produce a coating composition, which are able, preferably, to react with the hydroxyl groups of the compounds (B) and/or with the unreacted isocyanate groups of the compounds (V) and/or alkoxysilyl groups of the compounds (V) and to form network nodes.

By way of example it is possible as component (C) to use amino resins and/or epoxy resins. Suitability is possessed by the conventional amino resins some of whose methylol and/or methoxymethyl groups may have been defunctionalized by means of carbamate groups or allophanate groups. Crosslinking agents of this kind are described in U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Components (C) of this kind are used generally in fractions of up to 40% by weight, preferably of up to 30% by weight, more preferably of up to 25% by weight, based on the nonvolatile constituents of the coating composition as a whole.

The coating composition used may further comprise at least one conventional coatings additive in effective amounts, i.e., in amounts preferably up to 30% by weight, more preferably up to 25% by weight, and very preferably up to 20% by weight, based in each case on the nonvolatile constituents of the coating composition as a whole.

Examples of Suitable Coatings Additives are:
in particular, UV absorbers;
in particular, light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)$_3$ groups;
wetting agents such as siloxanes, fluorine compounds, carboxylic monoesters, phosphoric esters, polyacrylic acids and copolymers thereof or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details, refer to Rompp Lexikon "Lacke und Druckfarben", Georg Thieme Verlag, Stuttgart, 1998, pages 250 to 252; rheology control additives such as the additives known from patents WO 94/22968, EP-A-0 276 501, EP-A-0 249 201 or WO 97/12945; crosslinked polymeric microparticles, of the kind disclosed, for example, in EP-A-0 008 127; inorganic phyllosilicates such as aluminum magnesium silicates, sodium magnesium and sodium magnesium fluorine lithium phyllosilicates of the montmorillonite type; silicas such as Aerosils; or synthetic polymers containing ionic and/or associated groups, such as polyvinyl alcohol, poly(meth)acrylamide, poly(meth)acrylic acid, polyvinylpyrrolidone, styrene-maleic anhydride or ethylene maleic anhydride copolymer and derivatives thereof, or hydrophobically modified ethoxylated urethanes or polyacrylates; and/or flame retardants.

In a further embodiment of the invention the coating composition may further comprise additional pigments and/or fillers and may serve for producing pigmented topcoats. The pigments and/or fillers employed for this purpose are known to the skilled worker.

The coating composition is preferably a clearcoat material.

The coating compositions are suitable for all fields of use in which use is made of coating compositions with exacting requirements imposed on the acid resistance, smoothness, and scratch resistance of the coating, examples being the varnishing and sealing of wood and woodbase materials, the coating of metallic surfaces, and the painting and sealing of various plastics surfaces.

One preferred use of the coating compositions concerns all of the fields of use in which exacting requirements are imposed on the gloss of the coating, as for example in automotive OEM finishing.

Since the coatings produced from the above-defined coating compositions also exhibit outstanding adhesion to existing cured electrocoats, surfacer coats, basecoats or conventional clearcoats, they are outstandingly suitable, as well as for use in automotive OEM finishing, for automotive refinish or for the modular scratchproofing of automobile bodies that have already been painted.

The coating composition may be applied by any of the standard methods of application, such as spraying, knife coating, spreading, pouring, dipping, impregnating, trickling or rolling, for example. At application, the substrate to be coated may itself be at rest, with the application equipment or unit being moved. Alternatively the substrate to be coated, more particularly a coil, can be moved, with the application unit being at rest relative to the substrate or being moved appropriately.

It is preferred to employ spray application methods, such as compressed-air spraying, airless spraying, high-speed rotation, electrostatic spray application (ESTA), where appropriate in conjunction with hot spray application such as hot-air spraying, for example.

The curing of the applied coating composition may take place after a certain rest time. The rest time is used, for example, for the leveling and degassing of the coat films or for the evaporation of volatile constituents such as solvents. The rest time may be assisted and/or shortened through the application of elevated temperatures and/or through a reduced atmospheric humidity, provided this is not accompanied by any damage to or change in the coat films, such as premature complete crosslinking, for instance.

The applied coating composition may be cured—for example—thermally. Thermal curing of the applied coating composition has no peculiarities of method, but instead takes place in accordance with the conventional methods, such as heating in a forced-air oven or irradiation using IR lamps. In this context the thermal cure may also take place in stages. A further preferred curing method is that of curing with near infrared (NIR radiation).

The thermal cure takes place advantageously at a temperature of 30 to 200° C., more preferably 40 to 190° C., and very preferably 50 to 180° C., for a time of 1 min up to 10 h, more preferably 2 min up to 5 h, and very preferably 3 min to 3 h; at the temperatures employed for automotive refinish, which are preferably between 30 and 90° C., it is also possible to employ longer cure times.

The coating compositions afford cured coatings, more particularly coat systems, especially clearcoat systems, moldings, especially optical moldings, and self-supporting films that are highly scratch-resistant and more particularly are chemically stable and stable to weathering. More particularly it is possible to produce the coatings and coat systems, especially the clearcoat systems, in film thicknesses>40 µm without stress cracks occurring.

The coating compositions as defined above are therefore outstandingly suitable for producing decorative, protective and/or effect-imparting coatings and coat systems, with high scratch resistance, on bodies of means of transport (more particularly motor vehicles, such as motor cycles, buses, trucks or automobiles) or parts thereof; on the inside and outside of buildings; on furniture, windows, and doors; on polymeric moldings, more particularly CDs and windows; on small industrial parts, on coils, containers, and packaging; on white goods; on films; on optical, electrical, and mechanical components; and also on hollow glassware and articles of everyday use.

More particularly the coating compositions are used for producing coatings and coat systems, more particularly clearcoat systems, in the technologically and esthetically particularly demanding field of automotive OEM finishing and also of automotive refinish. With particular preference the coating compositions are used in a stage of multistage coating processes, more particularly in multistage coating processes in which an optionally precoated substrate has first a pigmented basecoat applied to it and thereafter a coat with the coating composition as defined above.

Accordingly the coating compositions are employed preferably in the clearcoat or topcoat (topmost coat) of multicoat systems.

To produce the underlying basecoat it is possible to use not only water-thinnable basecoat materials but also basecoat materials based on organic solvents. Suitable basecoat materials are described for example in EP-A-0 692 007 and in the documents cited therein at column 3, lines 50 et seq. Preferably the applied basecoat material is first dried—that is, at least some of the organic solvent and/or water is removed from the basecoat film in an evaporation phase. Drying takes place preferably at temperatures from room temperature to 80° C. After the drying procedure, the coating composition as defined above is applied. Subsequently the two-coat system is cured, preferably under conditions that are employed in automotive OEM finishing, at temperatures of 30 to 200° C., more preferably 40 to 190° C., and very preferably 50 to 180° C., for a time of 1 min to 10 h, more preferably 2 min up to 5 h, and very preferably 3 min to 3 h; in the case of the temperatures employed for automotive refinish, which are preferably between 30 and 90° C., longer cure times may also be employed. The coats produced with the coating compositions as defined above are notable in particular for especially high chemical resistance and weathering resistance and also for very good wash resistance and scratch resistance, and more particularly for an outstanding combination of scratch resistance and weathering stability with respect to UV radiation in a wet/dry cycle.

In another preferred embodiment of the invention the coating composition is used as a transparent clearcoat material to coat polymeric substrates, more particularly transparent polymeric substrates. In this case the coating composition includes UV absorbers, which are designed in quality and type for the effective UV protection of the polymeric substrate. Here as well the coatings obtained from the coating compositions are notable for an outstanding combination of scratch resistance and weathering stability toward UV radiation in a wet/dry cycle. The polymeric substrates thus coated are used preferably to replace glass components in automobile construction, the polymeric substrates being composed preferably of polymethyl methacrylate or polycarbonate.

The gloss of the coatings obtained from the coating compositions as defined above can be measured by means of the methods that are known to the skilled worker, for example, at an observation angle of 20° or 60°, using a gloss meter from Byk Gardner.

Following application and curing, the coating composition as defined above leads preferably to a coat having a gloss value≥87.0, more preferably having a gloss value≥88.0, at an observation angle of 20°.

Following application and curing, the coating composition as defined above leads preferably to a coat having a gloss value≥90.0, more preferably having a gloss value≥91.0, at an observation angle of 60°, measured in accordance with DIN EN ISO 2813 DE.

EXAMPLES

1.) Preparation Examples for Partly Silanized Crosslinking Agents

Preparation Example 1

Preparation of a Trimeric Isocyanate (HDI) Reacted to an Extent of 60 Mol % with Mercaptopropyltrimethoxysilane A three-neck glass flask equipped with a reflux condenser, a thermometer and a feed port is charged with 38.9 parts by weight of Basonat HI 100 (HDI, ® BASF), 36.93 parts by weight of Hydrosol A 170 (® Aral), and 0.22 part by weight of dibutyltin dilaurate (® Merck). Subsequently a feed consisting of 23.96 parts by weight of 3-mercaptopropyltrimethoxysilane (available commercially as Dynasylan MTMO from Evonik) is metered in over 45 minutes at a rate such that the attendant exotherm does not push the temperature beyond 60° C.

The mixture thus obtained was stirred at a temperature of 60° C. for 3 hours until titrimetric determination of the NCO value gave a residual free NCO group content of 3.42% by weight based on the solution (5.45% by weight based on the nonvolatile fraction).

Comparative Example 1

Preparation of a Trimeric Isocyanate (HDI) Reacted to an Extent of 60 Mol % with N-[3-trimethoxysilyl)propyl]butylamine A three-neck glass flask equipped with a reflux condenser, a thermometer and a feed port is charged with 36.23 parts by weight of Basonat HI 100 (HDI, ® BASF), 36.99 parts by weight of Hydrosol A 170 (® Aral). Subsequently a feed consisting of 26.79 parts by weight of N-[3-(trimethoxysilyl) propyl]butylamine (available commercially as Dynasylan 1189 from Evonik) is metered in over 45 minutes at a rate such that the attendant exotherm does not push the tempera-ture beyond 60° C. The mixture thus obtained was stirred at a temperature of 60° C. for 3 hours until titrimetric determination of the NCO value gave a residual free NCO group content of 3.19% by weight based on the solution (5.06% by weight based on the nonvolatile fraction).

Preparation Example 2

Preparation of a Trimeric Isocyanate (HDI) Reacted to an Extent of 60 Mol % with 3-Mercaptopropyltrimethoxysilane and Bis[3-trimethoxysilyl)propyl]amine in a Ratio of 70:30

A three-neck glass flask equipped with a reflux condenser, a thermometer and a feed port is charged with 35.94 parts by weight of Basonat HI 100 (HDI, ® BASF), 37.00 parts by weight of Hydrosol A 170 (® Aral). Subsequently a feed consisting of 15.49 parts by weight of 3-mercaptopropyltrimethoxysilane (available commercially as Dynasylan MTMO from Evonik) and 11.56 parts by weight of bis[3-(trimethoxysilyl) propyl]amine (available commercially as Dynasylan 1124 from Evonik) is metered in over 45 minutes at a rate such that the attendant exotherm does not push the temperature beyond 60° C.

The mixture thus obtained was stirred at a temperature of 60° C. for 3 hours until titrimetric determination of the NCO value gave a residual free NCO group content of 3.16% by weight based on the solution (5.02% by weight based on the nonvolatile fraction).

Comparative Example 2

Preparation of a Trimeric Isocyanate (HDI) Reacted to an Extent of 60 mol % with N-[3-(trimethoxysilyl)propyl]butylamine and bis[3-trimethoxysilyl) propyl]amine in a Ratio of 70:30

A three-neck glass flask equipped with a reflux condenser, a thermometer and a feed port is charged with 34.23 parts by weight of Basonat HI 100 (HDI, ® BASF), 37.04 parts by weight of Hydrosol A 170 (® Aral). Subsequently a feed consisting of 17.72 parts by weight of N-[3-(trimethoxysilyl) propyl]butylamine (available commercially as Dynasylan 1189 from Evonik) and 11.02 parts by weight of bis[3-(trimethoxysilyl) propyl]amine (available commercially as Dynasylan 1124 from Evonik) is metered in over 45 minutes at a rate such that the attendant exotherm does not push the temperature beyond 60° C.

The mixture thus obtained was stirred at a temperature of 60° C. for 3 hours until titrimetric determination of the NCO value gave a residual free NCO group content of 3.01% by weight based on the solution (4.78% by weight based on the nonvolatile fraction).

2.) Preparation Example 3 for a Polyol which can be Used for Coating

In a steel tank fitted out with monomer feed port, initiator feed port, thermometer, oil heating, and reflux condenser, 29.08 parts by weight of a commercial aromatic solvent mixture (Solventnaphtha® from DHC Solvent Chemie GmbH) are heated to 140° C. Then a mixture a1 of 3.39 parts by weight of solvent naphtha and 2.24 parts by weight of tert-butyl peroxy-2-ethylhexanoate is added with stirring and at a rate such that the addition of the mixture a1 is concluded after 6.75 h. 15 minutes after the beginning of the addition of the mixture a1, a mixture a2 consisting of 4.97 parts by weight of styrene, 16.91 parts by weight of tert-butyl acrylate, 19.89 parts by weight of 2-hydroxypropyl methacrylate, 7.45 parts by weight of n-butylmethacrylate, and 0.58 part by weight of acrylic acid is added at a rate such that the addition of the mixture a2 is concluded after 6 h. Following the addition of the mixture a1, the reaction mixture is held at 140° C. for a further 2 h and then cooled to below 100° C. Subsequently the reaction mixture is diluted with a mixture a3 of 3.70 parts by weight 1-methoxyprop-2-yl acetate, 3.06 parts by weight of butyl glycol acetate, and 6.36 parts by weight of butyl acetate 98/100.

The resulting solution of the polyacrylate polyol A has a solids content of 52.4% (1 h, 130° C., forced-air oven), a viscosity of 3.6 dPas (ICI plate/cone viscometer, 23° C.), hydroxyl number of 155 mg KOH/g, and an acid number of 10-13 mg KOH/g.

3.) Refractive Index Values of the Crosslinking Agents

|  | Crosslinking agent of Prep. Ex. 1 | Crosslinking agent of Comp. 1 | Crosslinking agent of Prep. Ex. 2 | Crosslinking agent of Comp. Ex. 2 |
| --- | --- | --- | --- | --- |
| nD20 | 1.507 | 1.497 | 1.502 | 1.496 |

The crosslinking agents from preparation examples 1 and 2 have a higher refractive index than corresponding crosslinking agents from comparative examples 1 and 2 which contain no polyisocyanates with thiourethane groups. The refractive indices were determined at 20° C. using an NAR-3T refractometer from ATAGO.

4.) Formulation Examples of the Curatives for Coating Compositions a-d

|  | a | b | c | d |
| --- | --- | --- | --- | --- |
| Crosslinking agent (from preparation example 1) | 80.5 | — | — | — |
| Crosslinking agent (from comparative example 1) | — | 86.3 | — | — |
| Crosslinking agent (from preparation example 2) | — | — | 87.1 | — |
| Crosslinking agent (from comparative example 2) | — | — | — | 91.5 |
| Catalyst (Nacure 4167; dialkyl phosphate neutralized with an organic amine) | 4.4 | 4.7 | 4.8 | 5.0 |
| BYK 301 (solution of a polyether-modified polydimethylsiloxane) | 0.2 | 0.2 | 0.2 | 0.2 |
| Tinuvin 384 (light stabilizer) | 0.9 | 0.9 | 0.9 | 0.9 |
| Tinuvin 292 (light stabilizer) | 0.8 | 0.8 | 0.8 | 0.8 |
| Polyol (from preparation example 3) | 45 | 45 | 45 | 45 |
| Solvent (Solvent naphtha) | 20 | 20 | 20 | 20 |

5.) Preparation of Coating Compositions a-d

The coating compositions a-d were formulated from the crosslinking agents (examples 1 and 2, comparative examples 1 and 2, as per table above) as follows: Component 1, comprising component A (polyol) and the abovementioned commercial additives and catalyst and solvent, is combined shortly prior to application with component 2, comprising component B (crosslinking agent from example 1 and 2 or comparative example 1 and 2) and stirred intimately together until a homogeneous mixture is formed.

6.) Production of Coatings A-D from Coating Compositions a-d

The coatings A-D were produced from coating compositions a-d as follows. The coating compositions were applied in an application film thickness of 40 μm to Bonder panels which had been provided with a typical black aqueous basecoat. In this case the aqueous basecoat film, which is 15 μm thick, is already cured. The application is made pneumatically at 2.5 bar in three spray passes.

Thereafter the coating is flashed off at room temperature for 5 minutes and then baked at 140° C. for 22 minutes.

7.) Gloss Values for Resulting Coatings A-D

Gloss values for the resulting coatings A-D were determined in accordance with DIN EN ISO 2813 DE, using a gloss meter from Byk Gardner, at observation angles of 20° and 60°.

| Observation angle | a | b | c | d |
| --- | --- | --- | --- | --- |
| 20° | 89.3 | 85.1 | 88.5 | 86.9 |
| 60° | 93.0 | 89.3 | 91.4 | 90.7 |

What is claimed is:

1. A method of crosslinking a coating composition, comprising using a compound (V) as a crosslinking agent in a curable coating composition, the compound (V) being the reaction product of at least one isocyanate compound (A) having an average NCO functionality of 2.0 to 6.0, with at least one compound of the general formula (I)

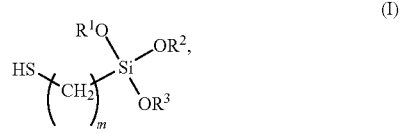

(I)

where m is 2, 3 or 4; and $R^1$, $R^2$, and $R^3$, independently of one another, are each H, unsubstituted or at least monosubstituted alkyl or unsubstituted or at least monosubstituted heteroalkyl, and from between 0.1% and 20% by weight, based on the nonvolatile constituents of the coating composition, of an amine-blocked phosphoric acid as a crosslinking catalyst;

wherein from 0.1 to 99 mol % of the isocyanate groups originally present in the isocyanate compound (A) have been reacted with the at least one compound of the general formula (I).

2. The method of claim 1, wherein 5 to 95 mol % of the isocyanate groups originally present in the isocyanate compound (A) have been reacted with the at least one compound of the general formula (I).

3. The method of claim 1, wherein m is 2, 3 or 4; and
$R^1$, $R^2$, and $R^3$, independently of one another, are each H, unsubstituted $C_{1-12}$ alkyl or unsubstituted 2- to 12-membered heteroalkyl.

4. The method of claim 3,
wherein m is 3; and
$R^1$, $R^2$, and $R^3$, independently of one another, are each H, methyl, ethyl, n-propyl, isopropyl, n-butyl, iso butyl, 2-butyl, tert-butyl, n-pentyl, 2-pentyl, iso-pentyl or neopentyl.

5. The method of claim 4,
wherein m is 3; and
$R^1$, $R^2$, $R^3$, independently of one another, are each ethyl or methyl.

6. The method of claim 1, wherein the isocyanate compound (A) is a polyisocyanate derived from a polyisocyanate by trimerization, dimerization, urethanization, biuretization or allophanatization.

7. The method of claim 6, wherein the derived polyisocyanate is based on a parent structure selected from the group consisting of hexamethylene diisocyanate, isophorone diisocyanate, and (4,4')-methylenedicyclohexyl diisocyanate.

8. A coating composition comprising
at least one binder,
at least one solvent,
at least one crosslinking agent comprising a compound (V) based on
at least one isocyanate compound (A) having an average NCO functionality of 2.0 to 6.0, wherein 0.1 to 99 mol % of the isocyanate groups originally present in the isocyanate compound (A) have been reacted with at least one compound of the general formula (I)

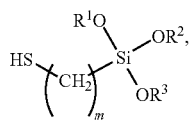

(I)

wherein m is 2, 3 or 4; and
$R^1$, $R^2$, $R^3$, independently of one another, are each H, unsubstituted or at least monosubstituted alkyl or unsubstituted or at least monosubstituted heteroalkyl; and
from between 0.1% and 20% by weight, based on the nonvolatile constituents of the coating composition, of a catalyst that is an amine-blocked phosphoric acid.

9. The coating composition of claim 8, wherein at least one binder is a hydroxyl compound (B).

10. The coating composition of claim 9, wherein the hydroxyl compound (B) is at least one of a low molecular mass polyol, an oligomeric polyol, a polymeric polyol or a mixture of these polyols.

11. The coating composition of claim 10, wherein the polymeric polyol is a poly(meth)acrylate polyol.

12. The coating composition of claim 8, that is a clearcoat material.

13. A method of coating a substrate, comprising applying to a substrate, the coating composition of claim 8 to produce a coating.

14. The method of claim 2, wherein 10 to 90 mol % of the isocyanate groups originally present in the isocyanate compound (A) have been reacted with the at least one compound of the general formula (I).

15. The method of claim 14, wherein 20 to 80 mol % of the isocyanate groups originally present in the isocyanate compound (A) have been reacted with the at least one compound of the general formula (I).

16. The coating composition of claim 8,
wherein m is 3; and
$R^1$, $R^2$, and $R^3$, independently of one another, are each H, methyl, ethyl, n-propyl, isopropyl, n-butyl, iso butyl, 2-butyl, tert-butyl, n-pentyl, 2-pentyl, iso-pentyl or neopentyl.

17. The coating composition of claim 16,
wherein m is 3; and
$R^1$, $R^2$, $R^3$, independently of one another, are each ethyl or methyl.

18. The coating composition of claim 8, wherein the derived polyisocyanate is based on a parent structure selected from the group consisting of hexamethylene diisocyanate, isophorone diisocyanate, and (4,4')-methylenedicyclohexyl diisocyanate.

19. The coating composition of claim 8, wherein 5 to 95 mol % of the isocyanate groups originally present in the isocyanate compound (A) have been reacted with the at least one compound of the general formula (I).

20. The method of claim 1, wherein the crosslinking catalyst is an amine-blocked acyclic phosphoric diester or an amine-blocked cyclic phosphoric diester.

21. The method of claim 20, wherein the crosslinking catalyst is an amine-blocked phosphoric acid ethylhexyl ester or an amine-blocked phosphoric acid phenyl ester.

22. The coating composition of claim 8, wherein the crosslinking catalyst is an amine-blocked acyclic phosphoric diester or an amine-blocked cyclic phosphoric diester.

23. The coating composition of claim 22, wherein the crosslinking catalyst is an amine-blocked phosphoric acid ethylhexyl ester or an amine-blocked phosphoric acid phenyl ester.

24. The method of claim 1, wherein the compound (V) has a refractive index of nD20>1.500 at a temperature of 20° C.

25. The coating composition of claim 8, wherein the compound (V) has a refractive index of nD20>1.500 at a temperature of 20° C.

* * * * *